April 22, 1969    J. E. BAYHA    3,440,606
NONMONETARY VENDING TOKEN AND VERIFICATION APPARATUS
Filed Jan. 29, 1965
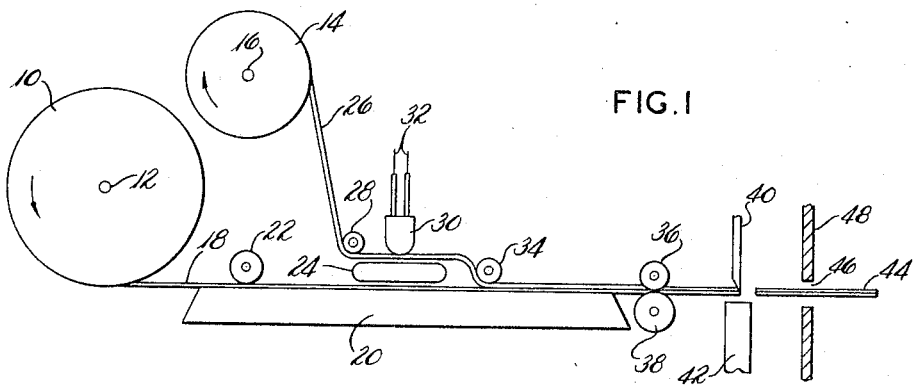
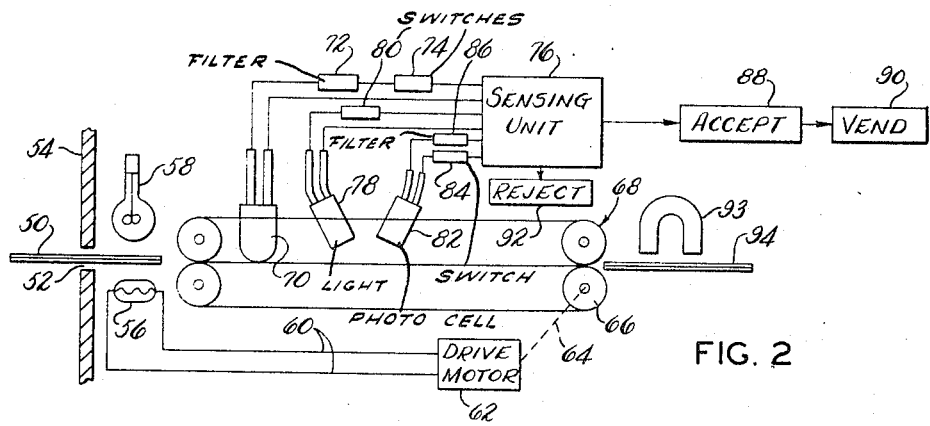
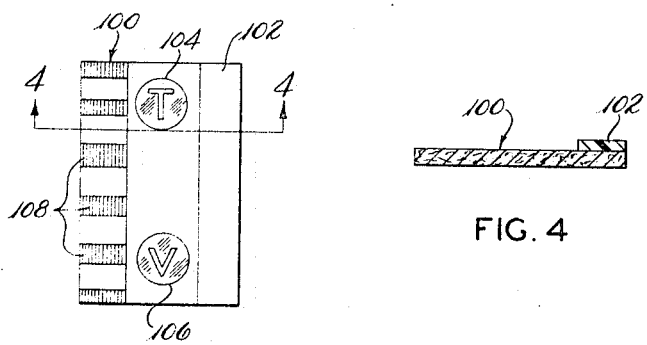
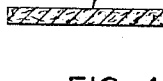
INVENTOR.
JACK E. BAYHA
BY Oldham & Oldham
ATTYS.

3,440,606
NONMONETARY VENDING TOKEN AND
VERIFICATION APPARATUS
Jack E. Bayha, Chesterland, Ohio, assignor to Transmarine Corporation, Chesterland, Ohio, a corporation of Ohio
Filed Jan. 29, 1965, Ser. No. 428,957
Int. Cl. H04q 1/00; G07f 1/06
U.S. Cl. 340—149     8 Claims

ABSTRACT OF THE DISCLOSURE

A nonmonetary vending token and apparatus in the form of a ticket which can be imprinted and suitably combined with a magnetic recording tape to provide at least three authentication tests in an associated acceptance apparatus. Specifically, the tests provide comparison of tones or frequency signals in a multitude of combinations to secure a validation indication. A magnetic sensitive tape, a photocell readout, and a determination of reflected light from a specialized coating provide the three tests for authentication.

---

This invention relates to a nonmonetary vending token and apparatus, and more particularly to a token in the form of a ticket which can be imprinted and suitably combined with a magnetic recording tape to provide at least three authentication tests in an associated acceptance apparatus.

Heretofore, it has been well known to use nonmonetary token vending apparatus which utilizes well known photocell validation techniques, based on certain properties of the paper tickets used as tokens. However, these validations have not provided many combinations of validation procedure, making counterfeiting rather easy. Further, these prior art techniques have utilized paper tickets, which might be easily interchangeable from one vending apparatus to another, thereby making wholesale counterfeiting quite possible and profitable. With the acceptance of vending apparatus, and the scarcity of coins available, the advantage of having a reduced amount of actual money required for token vending makes this type of system more and more desirable and necessary. Thus, it becomes extremely important to provide a nonmonetary token for vending operation with associated authenticating apparatus which will be inexpensive, yet highly reliable, and very difficult to compromise.

It is the general object of the present invention to avoid and overcome the difficulties of and objections to the prior art practices and meet the needs of the art by providing a nonmonetary vending token and associated authenticating apparatus which utilizes a paper ticket imprinted to provide an audio-tone test when the ticket is passed at a constant speed under a masked photocell, while further providing the ticket with a reflective coating so the reflective level will fall within predetermined boundaries, and further applying a magnetic sensitive tape to the ticket which may be imprinted with a constant tone audio signal to be detected upon authentication.

A further object of the invention is to provide a nonmonetary vending token and associated authenticating apparatus wherein the authenticating tests associated with the token and apparatus may be easily changed to provide hundreds of various combinations of tests by varying the properties of printing impressed upon the token, and the audio tone carried by a magnetic tape adhesively secured to the token.

A further object of the invention is to provide a token in the form of a paper ticket which may be provided with at least three separate test detection features, with each test detection feature having literally hundreds of different possibilities, thereby making the total possibilities of the three tests at a very high number of probabilities.

A further object of the invention is to provide a nonmonetary vending token and associated authenticating apparatus which is relatively simple, inexpensive, highly reliable, and efficient in operation.

A further object of the invention is to provide a nonmonetary vending token which utilizes magnetized tape associated therewith, which tape can be demagnetized upon authentication, to prevent subsequent use of the token.

A further object of the invention is to provide a nonmonetary vending token which is treated with a solution of quinine hydrochloride during its manufacture, whereby authenticating apparatus utilizes ultraviolet light to reflect and sense this token treatment.

The aforesaid and other objects of the invention are achieved by providing in a nonmonetary vending token and associated apparatus the combination of a paper ticket having a cross-lined stripe down one side to produce an audio tone when viewed by a masked photocell, and further having a reflective coating thereon to produce a predetermined light reflective level, a magnetic sensitive tape having a constant tone audio signal imprinted thereon operatively affixed to the ticket, authenticating apparatus to produce an output accept or reject signal comprising means to move the ticket at a constant speed, means to view the ticket as it is moved with a masked photocell to authenticate and readout the audio tone represented by the stripe on the ticket, means to reflect light from the reflective coating and read the level of light reflected, means to readout the constant audio tone imprinted on the magnetic sensitive tape, and means responsive to the signal obtained from the authenticating apparatus to effect a vending function.

For a better understanding of the invention reference should be had to the accompanying drawings, wherein:

FIGURE 1 is a schematic diagram of one embodiment of a machine utilized to manufacture the paper ticket with associated magnetic tape comprising the token of the invention;

FIGURE 2 is a schematic block diagram of an acceptor or autenticating unit which incorporates testing apparatus to validate the token received to produce an accept signal for a subsequent vending operation;

FIGURE 3 is a plan view of one embodiment of a ticket produced by the manufacturing unit of FIGURE 1, and received by acceptor unit of FIGURE 2, shown incorporating the three test features of the invention; and FIGURE 4 is a vertical cross sectional view of the ticket taken on line 4—4 of FIGURE 3.

While it should be understood that many other tests could be performed by a nonmonetary token for vending, the three most specifically described hereinafter seem to offer the most security for the least expense. However, it must be recognized that modifications and other embodiments of these tests fall within the scope and objects of the invention.

With reference to the form of the invention illustrated in the drawings, and particularly the manufacturing unit of FIGURE 1, the numeral 10 indicates a paper carrying roll mounted on an axis 12 for rotary movement. A magnetic tape carrying roll 14 is likewise mounted on an axis 16 for rotary movement. A web 18 from the paper roll 10 is fed across a support table 20. The pair web 18 is generally anticipated to be between about ½ to about 1½ inches in width, and made from a fairly heavy paper, such as that generally utilized for theater tickets, and the like. The web 18 may pass under a printing roller 22 before passing under a tape head receiving support 24. The roller 22 may be provided with an internal ink supply, or other suitable ink application means such as a doctor bar, etc., so that it will print a plurality of cross lines in a stripe down one side of the web 18, such that the stripe when in motion will produce a predetermined audio tone when viewed by a masked photocell. The stripe need not be cross lined to produce the desired audio tone, but could have spaced dots, squares, etc. Also, the printing need not produce a constant tone as any pulsed tone, as an electrical or audio signal will meet the objects of the invention. In fact, it should be understood that any form of markings which will produce a coded signal when viewed with a suitable photocell will suffice. The invention embraces all possible markings which will accomplish this purpose.

The printing roller 22 may also print a suitable reflective inked coating down substantially the center of the web 18, to provide a predetermined reflective level when the web 18 is subsequently illuminated with light and the reflective level measured by a suitable photocell.

A tape web 26 from the magnetic tape roll 14 is fed under a directing roller 28 onto the top of the tape head receiving support 24 and under a taping head 30, which head 30, which head 30 may be supplied from a suitable voltage source through wires 32. Utilizing conventional tape recording techniques, the head 30 may imprint a magnetic pattern onto the tape web 26 so as to produce a constant, pulsed, or other coded audio tone when the mgnetic tape is readout, again in accordance with the standard tape recording procedure. It is anticipated that the tape web 26 will have a conventional ferrous oxide coating and be about the width of standard recording tape, or between about ¼ and about ½ inch. Further, it is anticipated that the tape web 26 will have a pressure sensitive adhesive on its bottom side so that when the web leaves recording support 24, and passes under a roller 34, it is pressed into position on the top side of the paper web 18, and preferably along an edge thereof opposite to the printed striped edge, and adhesively held in position by the pressure sensitive adhesive. Other suitable adhesive means could also be used to secure the magnetic tape web 26 to the paper web 18, or paper could be coated in advance wtih oxide using known techniques.

In order to further assure that the recorded tape web 26 is firmly pressed into position on the paper web 18, a pair of pressure rollers 36 and 38 may be provided. Of course these rollers will not be necessary if a paper having one side thereof coated with ferrous oxide is used in place of the separate tape web 26. Further, in order to cut the combined laminate into a desired ticket length, a cutter 40 may cut against an anvil 42. A severed ticket token 44, in the completed form, is shown passing through an opening 46 in what might be called a sidewall 48 or container for the manufacturing unit.

Of course, it should be recognized that any of a plurality of ways could be utilized to manufacture the desired ticket 44 shown in FIGURE 1. However, it is essential that every ticket manufactured shall have been provided with three features which might be tested in an authenticating apparatus. Namely, the printed cross lined stripe down one side, a reflective coating of some type in the center, and the magnetized tape down the other side. However, it should be understood that while FIGURE 1 shows that the printing and the magnetized tape are all on the top side of the ticket 44, the printing might be positioned on the bottom side, and the tape on the top, or half the printing on each side, with the tape on whatever side may be convenient, all as necessitated by the positioning of the test validating equipment in the authenticating apparatus.

FIGURE 2 illustrates an acceptor or authenticating apparatus or unit which receives a ticket 50 through an opening 52 in a housing 54 which may surround the authenticating unit. A photocell 56 with associated light source 58 may be positioned immediately adjacent the openng 52 so that the ticket 50 will break the light passage from the source 58 to the photocell 56, which through lines 60 actuate a drive motor 62. The drive motor 62 is operatively connected, as indicated by the dotted lines 64, to drive at least one roller 66 of a two belt conveyor system, indicated generally by numeral 68. The conveyor system 68 is mounted so as to receive the ticket 52 between the belts thereof, and draw the ticket at a constant speed therealong. The conveyor 68 may merely clamp the ticket 50 along the edges thereof, or be provided with a cutout window or windows, or use a vacuum suction principle, or any suitable means to move the ticket 50 in a flat position at a constant speed along the belt paths.

In order to perform test validations on the token 50 moved along the conveyor 68, a tape head 70 is positioned so as to readout the magnetic tape portion positioned along one edge of the ticket 50. The tone read by the tape head 70 may be passed along into any conventional tone selective filter 72 to determine if it is the proper tone. The filter 72 may be manually adjustable to any desired tone. If the proper signal is received by the filter 72, a signal will be sent to a switch 74 for actuation thereof to provide an accept signal into a sensing unit 76.

The proper actuation of the sensing unit 76 by an accept signal from the filter 72 through the switch 74 will actuate a light 78 through a switch 80. The light 78 will be directed primarily towards the cross lined striped portion along the other edge of the ticket, as well as toward the center reflective portion of the ticket. These printings on the ticket 50 were provided by the printing roller 22 on the web 18, as described with reference to FIGURE 1 above. The reflections of the light 78 will be detected by a photocell 82. The photocell 82 is equipped to detect the light reflection level on the ticket to see if it falls within prescribed levels. If it does fall within predetermined levels, it may actuate a switch 84 into the sensing unit 76. Likewise, the light 78 may be masked or the photocell 82 may be masked so as to readout the cross lined stripe portion on the ticket as a particular audio tone. If this tone is passed into a tone selective filter 86, it can be authenticated as the proper tone. A proper tone will actuate the filter 86 to send an accept signal into the sensing unit 76.

Thus, if the sensing unit 76 receives the initial affirmative signal through switch 74 indicating a proper tone picked up by the head 70, the light 78 will be actuated to conduct the reflective test and the audio tone test utilizing the cross lined stripe. If these signals are both positive, the sensing unit 76 will properly note this information and send an accept signal 88 to generate a vend function 90. If any of the three tests are not proper, the sensing unit will generate a reject signal 92 which may reverse the drive of the motor 62 causing any ticket or token injected thereinto to be sent back out the slot 52. As a precaution against duplicate use of tokens, a permanent magnet 93 may be provided to demagnetize the magnetic tape section on a ticket 94 as it leaves the conveyor belt 68. Thus the ticket 94 will not have any audio tone on the magnetized tape portion and therefore be an invalid or worthless token.

FIGURE 3 illustrates a token or ticket which comprises the cross lined stripe portion, indicated generally by numeral 100, the magnetic tape portion 102 and at least two reflective portions 104 and 106. The plurality of lines 108 making up the cross lined portion 100 may be of any desired thickness or spacing so as to provide the proper audio tone when moved at a constant speed under the masked photocell. It should be readily understood that these lines 108 may be varied to provide different audio tones. FIGURE 4 shows a cross sectional view of the ticket of FIGURE 3 illustrating how the magnetic tape 102 is actually mounted on top of the ticket, and as stated above, may be held in place with pressure sensitive adhesive.

While FIGURE 2 shows one possible arrangement for an acceptor or authenticating unit, it should be understood that while the same authenticating test can be performed, the location of the authenticating tape head, tone selective filters, and photocells which are substantially convential known components, or the means to move the ticket along a path for purposes of authentication, may be varied or changed. Other conventional means, such as a shredder, cutting knives, etc., could be utilized to destroy or invalidate the ticket or token after it has properly activated the authenticating unit. The speed of the ticket through the unit may be varied as desired to provide proper tone code authentication. Both the tone selective filters 72 and 86 can be manually adjusted to provide for any desired tone selection to properly correspond with the printed tone on the ticket and the imprinted tone on the magnetic tape. This selection of tones provides an infinite variation in the validation procedure. However, as one alternative construction, both tones might be the same in order to both feed into the same tone selective filter for comparison against each other, in an effort to minimize the amount of equipment and cost thereof, as there would be no need for a constant speed in the device.

It should be seen that this type of ticket with the particular test performed in an acceptance or authentication unit would allow for weekly changes of validations to greatly enhance the security of the tokens used. Flexibility of this system by changing tones is designed to allow every location for vending equipment to utilize a different combination. It should be noted that this system makes use of basic tape recording technology, and requires nothing radically new, with the possible exception of a special pressure sensitive tape backing or coating of paper using known techniques. It might be noted that a prepared striped paper roll could be used rather than having a printing roller do the striping in a manufacturing machine, should this be desired. The tone selective devices could be conventional reed banks, or perhaps some more sophisticated devices now well known in the art.

It is also possible that the paper web, or the ink used to effect the printing thereon, or particularly the reflective coating, such as those areas 104 and 106 in FIGURE 3, be treated with a solution of quinine hydrochloride as part of the ticket manufacture. In this manner, the acceptance until then would use an argon reflective light rather than a conventional lamp to detect the presence of quinine hydrochloride. Such lamps are readily available at cost little more than the normal incandescent, and will operate directly from conventional AC voltage lines. This would cause the machine to accept only this type of paper, since under the illumination of the argon lamp, the paper would become phosphorescent, giving off more light than normal paper. Again this would make the token hard to compromise and prevent counterfeiting.

What is claimed is:

1. In a nonmonetary token vending apparatus the combination of:
    a paper ticket having a cross lined stripe down one side to produce an audio tone when viewed by a photocell, and further having a reflective coating thereon to produce a predetermined light reflective level,
    a magnetic sensitive tape having a constant tone audio signal imprinted thereon operatively affixed to the ticket,
    authenticating apparatus to produce an output accept or reject signal comprising:
        means to move the ticket at a constant speed,
        means to view the ticket as it is moved with a photocell to authenticate and readout the audio tone represented by the cross lined stripe on the ticket,
        means to reflect light from the reflective coating and read the level of light reflected, and
        means to read out and authenticate the constant audio tone imprinted on the magnetic sensitive tape, and
    means responsive to the signal obtained from the authenticating apparatus to effect a vending function.

2. A nonmonetary token vending apparatus according to claim 1 where the audio tone readouts from the cross lined stripe and the magnetic sensitive tape are sent to respective preset selective tone filters for proper tone authentication.

3. In a nonmonetary token vending apparatus the combination of:
    a flat ticket shaped token having a cross lined stripe down one side to produce an audio tone when viewed by a photocell, said token further having a reflective coating thereon to produce a predetermined light reflective level,
    a magnetic sensitive tape having a constant tone audio signal imprinted thereon operatively affixed to the other side of the token,
    authenticating apparatus to accept the token and produce an output accept or reject signal comprising:
        means to move the token at a constant speed through the apparatus,
        means to view the token as it is moved with a photocell to authenticate and readout the audio tone represented by the cross lined stripe on the token,
        means to reflect light from the reflective coating on the token and read the level of light reflected, and
        means to read out and authenticate the constant audio tone imprinted on the magnetic sensitive tape, and
    means responsive to an accept signal obtained from the authenticating apparatus to effect a vending function.

4. A nonmonetary token vending apparatus according to claim 3 where the reflective coating contains a quantity of quinine hydrochloride and an argon lamp is used to reflect light off the reflective coating to detect a phosphorescent effect.

5. A nonmonetary token vending apparatus according to claim 3 where tone selective filters are preset on the proper authenticating tone, and which filters receive and verify the constant audio tone readout from the cross lined stripe and the magnetic sensitive tape.

6. In a nonmomentary vending system the combination of a token comprising a rectangularly shaped substantially flat ticket made from paper having a printed cross lined stripe down one side thereof which will produce a desired audio tone when viewed by a photocell, a ferrous oxide coated tape adhesively secured to the opposite side of the ticket and having magnetically imprinted thereon a constant tone audio signal, a reflective coating on the center of the ticket so as to reflect light at a predetermined specific level, and a ticket acceptance unit for authentication comprising a photocell to detect when a ticket is being inserted therein, means actuated by the photocell to grasp and move the ticket at a constant speed through the acceptance unit, a tape head to detect the constant audio tone imprinted thereon, a tone selective filter receiving the tone detected by the tape head and producing an output current upon receipt of a proper tone, a sensing unit actuated by the output current from the tone selective filter, a light means actuated by the sensing unit to project light upon the ticket, means to detect the amount of light reflected off the ticket to determine if it falls within preselected levels, photocell means to detect the audio tone produced by viewing the printed cross lined striped own one side of the ticket to produce an output signal upon viewing the proper tone, said output signal causing the sensing unit to send out an accept signal, and vending means responsive to an accept signal from the sensing circuit.

7. In a nonmonetary vending token and apparatus the combination of:
    a token having the form of a ticket and printed with at least one cross lined stripe which will produce a constant tone audio signal when viewed by a photocell,
at least one piece of a magnetic sensive tape adhesively positioned on the token and magnetically imprinted with an audio signal,
means to readout the audio signal on the magnetic sensitive tape,
a first tone selective filter to authenticate the audio signal readout on the magnetic sensitive tape,
means to readout the audio signal represented by the cross lined stripe,
a second tone selective filter to authenticate the audio signal readout on the cross lined stripe, and
a sensing unit actuated by the proper audio tone reception in the filters to indicate an accept signal.

8. A token and apparatus according to claim 7 where the token is further provided with a specific reflective coating with means provided to readout the light reflective level and send a signal to the sensing unit if the level falls within predetermined standards.

References Cited

UNITED STATES PATENTS

| | | | |
|---|---|---|---|
| 2,950,799 | 8/1960 | Timms | 250—219 XR |
| 2,983,354 | 5/1961 | Ember et al. | 194—4 |
| 3,040,323 | 6/1962 | Brenner et al. | 209—111.8 XR |
| 3,122,237 | 2/1964 | Stenstrom | 209—111.5 |
| 3,174,029 | 3/1965 | Cunningham | 235—61.11 XR |
| 3,282,388 | 11/1966 | Lester et al. | 194—4 |
| 3,353,164 | 11/1967 | Folsom. | |

DONALD J. YUSKO, *Primary Examiner.*

U.S. Cl. X.R.

194—4